US009406071B2

(12) United States Patent
Liyanage et al.

(10) Patent No.: US 9,406,071 B2
(45) Date of Patent: Aug. 2, 2016

(54) CALCULATING UNIQUE SOCIAL NETWORKING SYSTEM USERS PERFORMING AN ACTION ON A SOCIAL NETWORKING SYSTEM OBJECT

(71) Applicants: Janaka Liyanage, Mountain View, CA (US); David Gross-Baser, Mountain View, CA (US)

(72) Inventors: Janaka Liyanage, Mountain View, CA (US); David Gross-Baser, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 570 days.

(21) Appl. No.: 13/627,945

(22) Filed: Sep. 26, 2012

(65) Prior Publication Data
US 2014/0089402 A1 Mar. 27, 2014

(51) Int. Cl.
*G06F 15/16* (2006.01)
*G06F 15/173* (2006.01)
*G06Q 30/02* (2012.01)
*G06Q 50/00* (2012.01)

(52) U.S. Cl.
CPC ............... *G06Q 30/02* (2013.01); *G06Q 50/01* (2013.01)

(58) Field of Classification Search
CPC .............. G06Q 50/01; G06Q 30/0251; G06Q 30/0255; G06Q 30/0201; G06Q 30/0631; H04L 67/22; H04L 51/32; H04L 43/045; H04L 51/063; H04L 67/1044
USPC .................................. 709/204, 206, 223, 224
See application file for complete search history.

(56) References Cited

U.S. PATENT DOCUMENTS

| 7,185,085 | B2 * | 2/2007 | Bean | G06F 11/3495 700/80 |
| 7,516,220 | B1 * | 4/2009 | Stiert | G06F 21/55 709/203 |
| 2002/0046085 | A1 * | 4/2002 | Rochon | G06Q 30/02 705/14.25 |
| 2003/0163563 | A1 * | 8/2003 | Bean | G06F 11/3495 709/224 |
| 2006/0200434 | A1 * | 9/2006 | Flinn | G06N 99/005 706/12 |

(Continued)

FOREIGN PATENT DOCUMENTS

JP 4370899 B2 11/2009
KR 10-2010-0109847 10/2010

OTHER PUBLICATIONS

PCT International Search Report and Written Opinion, PCT Application No. PCT/US2013/054801, Nov. 27, 2013, fourteen pages.

(Continued)

*Primary Examiner* — Edward Kim
(74) *Attorney, Agent, or Firm* — Fenwick & West LLP

(57) ABSTRACT

A social networking system generates one or more metrics describing user interactions with objects to describe the popularity of the objects among users. Data describing actions performed by social networking system users on objects stored by the social networking system to identify an action, the user performing the action and the object on which the action was performed. Stored actions performed on a selected object are retrieved and a subset of the actions is generated by sampling the stored actions at a sampling rate. A number of unique users included in the subset is determined and used along with the sampling rate to determine the number of unique users included in the retrieved actions, which is used to derive a metric describing user interaction with the selected object.

22 Claims, 2 Drawing Sheets

(56) References Cited

U.S. PATENT DOCUMENTS

| | | | |
|---|---|---|---|
| 2008/0288354 A1* | 11/2008 | Flinn | G06N 99/005 705/14.53 |
| 2009/0018918 A1* | 1/2009 | Moneypenny | G06N 99/005 705/14.73 |
| 2009/0144075 A1 | 6/2009 | Flinn et al. | |
| 2010/0228850 A1* | 9/2010 | Fomitchev | G06Q 30/02 709/224 |
| 2011/0015992 A1* | 1/2011 | Liffiton | G06Q 30/02 705/14.46 |
| 2011/0137902 A1* | 6/2011 | Wable | G06F 17/30867 707/737 |
| 2012/0096532 A1* | 4/2012 | Tiu, Jr. | G06F 17/3089 726/7 |
| 2012/0166530 A1* | 6/2012 | Tseng | G06Q 30/0255 709/204 |
| 2012/0215846 A1 | 8/2012 | Howes et al. | |
| 2012/0233256 A1 | 9/2012 | Shaham et al. | |
| 2013/0046615 A1* | 2/2013 | Liyanage | G06Q 30/0242 705/14.45 |
| 2013/0232189 A1* | 9/2013 | Lewis | G06Q 30/02 709/203 |

OTHER PUBLICATIONS

U.S. Appl. No. 13/167,701, filed Jun. 24, 2011.

* cited by examiner

CALCULATING UNIQUE SOCIAL NETWORKING SYSTEM USERS PERFORMING AN ACTION ON A SOCIAL NETWORKING SYSTEM OBJECT

BACKGROUND

This disclosure relates generally to metrics for determining popularity, and more specifically to metrics for determining popularity based on user actions.

Social networking systems allow their users to easily interact and communicate with each other. A variety of different types of social networking systems exist that provide mechanisms allowing users to interact within their social networks. In this context, a user may be an individual or any other entity, such as a business or other non-person entity. Social networking systems also allow their users to interact with each other, or with other objects maintained in a social networking system, by performing various actions. For example, users may post comments to pages associated with other users, view images, view video, listen to audio data or perform other actions on various objects maintained by the social networking system.

Often, social networking users may desire to identify objects maintained by the social networking system in which multiple users are interested. For example, a user may seek to identify pages that a number of other users have interacted with over a day, a week or another recent time interval. This allows the user to identify and view content in which users have recently taken an interest.

While conventional social networking systems allow users to express preferences for objects, a user typically provides this information once per object, making it difficult to discern whether users are recently interested in an object or had previously been interested in an object. For example, if a song was popular years ago, many users may have previously expressed a preference for a page associated with the song, but the song and its associated page are not necessarily currently popular. Similarly, determining a number of actions performed on an object provides limited information about the popularity of the page, as a small number of users may be responsible for a large number of actions performed on an object. For example, a small number of users may perform a large number of actions on a page associated with an obscure hobby.

SUMMARY

A social networking system includes user profiles associated with its users and maintains objects on which the users perform actions. Examples of objects include a page maintained by the social networking system, content posted to a page maintained by the social networking system, a status update from a user, a photograph, a video, an audio file, a link, an application, a check-in at a location, or any other content maintained by the social networking system. The social networking system also stores action data describing actions performed by users and the objects on which the actions were performed. For example, stored action data describing an action includes a user identifier of the user performing the action, a description of the action and an object identifier of the object on which the action was performed. Based on the stored action data, the social networking system calculates one or more metrics describing user interactions with objects. One or more of the metrics may describe the popularity of an object based on the number of unique social networking system users performing at least one action on the object (e.g., by posting content that refers to the object).

To calculate the one or more metrics for an object, the social networking system retrieves stored action data associated with an object identifier corresponding to the object. The retrieved action data describes actions performed by social networking system that are associated with the object identifier. To efficiently calculate the one or more metrics, the retrieved action data associated with the object identifier is sampled at a sampling rate. This reduces the amount of action data associated with the object to reduce the time for calculating a metric. The sampling rate may depend on the size of the retrieved action data, so that fewer samples of the retrieved action data are included in the subset as the number of actions described by the retrieved action data increase. A number of unique user identifiers included in the subset of the action data is determined and used, along with the sampling rate, to determine a number of unique user identifiers in the retrieved action data associated with the object identifier. One or more metrics may then be determined from the number of unique user identifiers in the retrieved action data associated with the object identifier, such as a total number of unique user identifiers, a number of unique user identifiers within a specified time range, a total number of unique user identifiers associated with a specified type of action or any other suitable metric. The one or more metrics are stored and associated with the object identifier, allowing them to be readily retrieved.

In addition to generating one or more metrics associated with objects, the social networking system may calculate one or more metrics describing user interactions with topics. Multiple objects maintained by the social networking system may be associated with the same topic, so a metric describing user interactions with topics accounts for actions performed by users on various objects associated with a topic. For example, the social networking system determines object identifiers associated with a topic and retrieves action data associated with the object identifiers. The action data is sampled at a sampling rate, as described above, to generate a subset of the action data and the number of unique user identifiers in the subset of the action data is determined. From the sampling rate and the number of unique user identifiers in the subset of the action data, the number of unique user identifiers in the action data is determined and used to generate one or more metrics describing user interaction with the topic.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
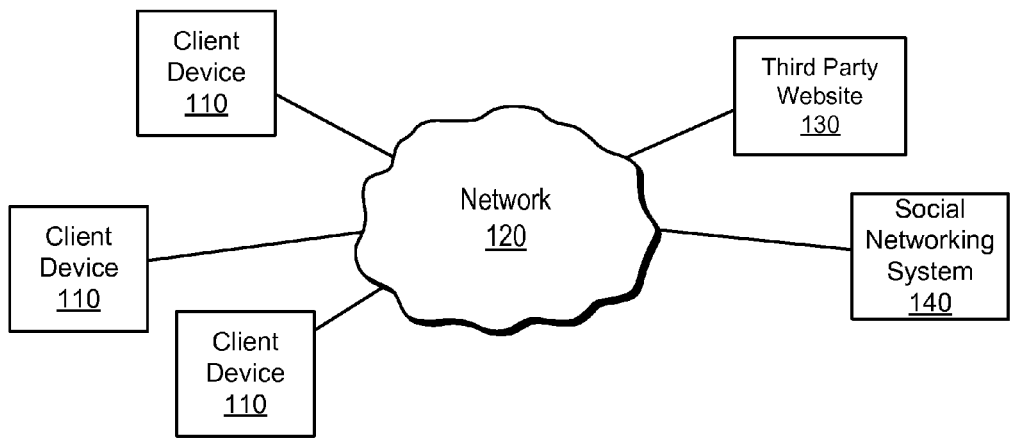
FIG. 1 is a block diagram of a system architecture for providing content items to users of a social networking system, in accordance with an embodiment of the invention.

FIG. 1 is a high level block diagram illustrating a system environment 100 of a social networking system 140. The system environment 100 comprises one or more client devices 110, a network 120, one or more third-party websites 130 and the social networking system 140. In alternative configurations, different and/or additional components may be included in the system environment 100. The embodiments described herein can be adapted to online systems that are not social networking systems.

The client devices 110 comprise one or more computing devices capable of receiving user input as well as transmitting and/or receiving data via the network 140. For example, the client devices 110 may be desktop computers, laptop computers, smartphones, personal digital assistants (PDAs) or any other device including computing functionality and data communication capabilities. A client device 110 is configured to communicate via the network 120, which may comprise any combination of local area and/or wide area networks, using both wired and wireless communication systems. In one embodiment, a client device 110 executes an application allowing a user of the client device 110 to interact with the social networking system 140. For example, a client device 110 executes a browser application to enable interaction between the client device 110 and the social networking system 140 via the network 120.

In some embodiments, a client device 110 also has location determination capabilities for determining a geographic location where the client device 110 is located. For example, a client device 110 includes a global positioning system (GPS) or other suitable system for determining a location for the client device 110. The client device 110 may communicate its location information to the social networking system 140 or to a third-party website 130 subject to privacy settings specified by a user of the client device 110. The privacy settings allow a user to limit distribution of the client device location to entities identified by the user or allow a user to specify a subset the client device locations (e.g., locations that the user approves for communicating to an entity) to other entities via the network 120.

The client devices 110 are configured to communicate with each other, with the third-party website 130 and/or with the social networking system 140 via the network 120, which may comprise any combination of local area and/or wide area networks, using both wired and wireless communication systems. In one embodiment, the network 120 uses standard communications technologies and/or protocols. Thus, the network 120 may include links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 120 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 130, or multiple third-party websites 130, may be coupled to the network 120 for communicating with the social networking system 140, which is further described below in conjunction with FIG. 2.

Figure 2:
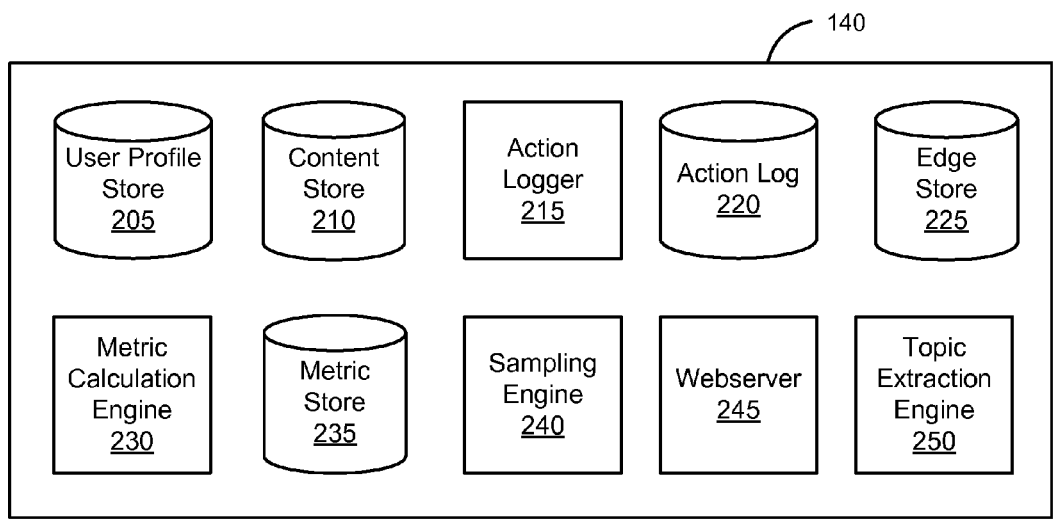
FIG. 2 is a block diagram of a social networking system, in accordance with an embodiment of the invention.

FIG. 2 is a block diagram of an embodiment of a social networking system 140. In the embodiment shown by FIG. 2, the social networking system 140 includes a user profile store 205, a content store 210, an action logger 215, an action log 220, an edge store 225, a metric calculation engine 230, a metric store 235, a log sampler 240, a web server 245, and a topic extraction engine 250. In other embodiments, the social networking system 140 may include additional, fewer, or different modules for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user, and may also include profile information inferred by the social networking system 140. In one embodiment, a user profile includes multiple data fields, each data field describing one or more attributes of the corresponding user of the social networking system 140. The user profile information stored in user profile store 205 describes the users of the social networking system 140, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 140 displayed in an image. A user profile in the user profile store 205 may also maintain references to actions by the corresponding user performed on objects in the object store 210 and stored in the action log 220.

The content store 210 stores content objects. A content object, or "object," may include any type of object on the social networking system 140, such as a page post, a status update, a photo, a video, a link, a shared content item, a gaming application achievement, a check-in event at a local business and so on. Content objects include objects created by users of the social networking system 140, such as status updates that may be associated with photo objects, location objects, and other users, photos tagged by users to be associated with other objects in the social networking system 140, such as events, pages, and other users, and applications installed on the social networking system 140. In some embodiments, the content objects are received from third-party applications or third-party applications separate from the social networking system 140. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact within the social networking system 140.

In one embodiment, the social networking system 140 includes a topic extraction engine 250, which identifies one or more topics associated with objects in the content store 210. To identify topics associated with content items, the topic extraction engine 150 may identify anchor terms described in the content items (e.g., in posts of the user) associated with the action and determines the meaning of the terms as further described in U.S. application Ser. No. 13/167,701, filed Jun. 24, 2011, which is hereby incorporated by reference in its entirety. For example, the topic extraction engine 250 determines one or more topics associated with a page maintained in the content store 210 on which a user performed an action. The one or more topics associated with an object are stored and associated with an object identifier corresponding to the object. In various embodiments, associations between object identifiers and topics are stored in the topic extraction engine 250 or in the content store 210. This allows retrieval of one or more topics associated with an object identifier or retrieval of object identifiers associated with a specified topic.

The action logger 215 receives communications about user actions on and/or off the social networking system 140. The action logger 215 populates the action log 220 with information about user actions, allowing the actions to be tracked. Example actions include: adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well. These actions are stored in the action log 220. The action logger 215 also receives data describing interaction between a user and a sequence and communicates the interaction between user and sequence to the action log 220.

The action log 220 may be used by the social networking system 140 to track users' actions on the social networking system 140 as well as external websites that communicate information back to the social networking system 140, such as the third party website 130. Users may interact with various objects on the social networking system 140, including commenting on posts, sharing links, and checking-in to physical locations via a mobile device, accessing content items in a sequence or other interactions. Information describing these actions is stored in the action log 220. Additional examples of interactions with objects on the social networking system 140 included in the action log 220 include commenting on a photo album, communications between users, becoming a fan of a musician, adding an event to a calendar, joining a groups, becoming a fan of a brand page, creating an event, authorizing an application, using an application and engaging in a transaction. Additionally, the action log 220 records a user's interactions with advertisements on the social networking system 140, interactions with content items, as well as interactions with applications operating on the social networking system 140.

The action log 220 may also include user actions on external websites, such as third-party website 130. For example, the action logger 215 receives data describing a user's interaction with a third-party website 130, which is stored in the action log 220. Examples of actions where a user interacts with a third-party website 130 includes a user expressing an interest in a third-party website 130 or another entity, a user posting a comment to the social networking system 140 that discusses a third-party website 120, or a web page 122 within the third-party website 130, a user posting to the social networking system 140 a Uniform Resource Locator (URL) or other identifier associated with a third-party website 130, a user attending an event associated with a third-party website 130 or any other action by a user that is related to a third-party website 130. For example, an e-commerce website that primarily sells luxury shoes at bargain prices may recognize a user of a social networking system 140 through social plug-ins that enable the e-commerce website to identify the user of the social networking system. Because users of the social networking system 140 are uniquely identifiable, e-commerce websites, such as this luxury shoe reseller, may use the information about these users as they visit their websites. The action log 220 records data about these users, including viewing histories, advertisements that were clicked on, purchasing activity, and buying patterns. Hence, interactions between a social networking system user and a third-party website 130 may also be stored in the action log 220.

When storing an action, the action log 220 stores a unique user identifier and a unique object identifier for each action. This allows data associated with a specific user identifier or a specific object identifier to be retrieved from the action log 220. For example, an object identifier associated with a specific page is used to retrieve actions associated with the object identifier performed by users. Additionally, data in the action log 220 associated with an action may include a date and time when the action was performed, allowing data to be retrieved from the action log 220 based on a specific date or time or based on a range of dates and/or times.

The edge store 225 stores the information describing connections between users and other objects on the social networking system 140 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system, sharing a link with other social networking system users and commenting on posts made by other users of the social networking system. The edge store 225 stores edge objects that include information about the edge, such as affinity scores for objects, interests, and other users. Affinity scores may be computed by the social networking system 140 over time to approximate a user's affinity for an object, interest, and other users in the social networking system 140 based on the actions performed by the user. Example embodiments of computing affinity scores are described in a related application, "Contextually Relevant Affinity Prediction in a Social Networking System," U.S. patent application Ser. No. 12/978,265, filed on Dec. 23, 2010, which is hereby incorporated by reference in its entirety. Multiple interactions between a user and a specific object may be stored in one edge object in the edge store 225, in one embodiment. In some embodiments, connections between users and objects may be stored in the content store 210 with connections between users stored in the user profile store 205, or the content store 210.

Based on data in the action log 220, the metric calculation engine 230 calculates one or more metrics describing user actions performed on a specified object. The metric calculation engine 230 retrieves data from the action log 220 associated with a specified object identifier associated with the specified object and determines one or more metrics describing user interaction with the specified object. The data retrieved from the action log 220 may be further refined by action type. The metric calculation engine 230 may retrieve data from the action log 220 identifying actions performed by users on the specified object that are distributed to additional users. For example, the social networking system 140 identifies certain types of actions performed by a user to other users connected to the user, so the metric calculation engine 230 retrieves actions performed on a specified object having the certain types.

The metric calculation engine 230 determines a number of unique user identifiers included in the retrieved data and calculates one or more metrics based on the number of unique user identifiers. For example, the metric may provide a count of the number of unique user identifiers or may provide a count of the number of unique user identifiers within a specified time interval. As an additional example, the metric may identify a number of unique users performing a specified type of action on the specified object (e.g., a number of unique users sharing a page or a number of unique users commenting on a page).

The metric calculation engine 230 may also be used to calculate one or more metrics describing user actions associated with a topic. As described above, the topic extraction engine 250 identifies one or more topics associated with objects, allowing associations between object identifiers and topics to be maintained. A topic may be identified to the metric calculation engine 230, which retrieves object identifiers associated with the topic from the topic extraction engine 250 and/or from the content store 210. Using the object identifiers associated with the topic, the metric calculation engine 230 retrieves action data from the action log 210 associated with the object identifiers. The retrieved action data is then sampled to generate a subset and the number of unique user identifiers associated with the retrieved action data is determined from the subset and a sampling rate. This may be used to calculate one or more topic-specific metric, allowing assessment of user interactions with topics that may be associated with multiple objects rather than interactions with a specific object.

However, the action log 220 may include a large number of actions associated with a specified object identifier, which may delay metric generation. To reduce the time needed to generate a metric from a large number of actions, the metric calculation engine 230 communicates with a sampling engine 240, which generates a subset of actions associated with a specified object identifier by capturing samples from the actions associated with the specified object identifier at a sampling rate. For example, a sampling rate of five indicates that one out of five actions from the actions associated with the object identifier is included in the subset of actions. The metric calculation engine 230 uses the generated subset as well as information about how the data was sampled to more quickly generate the metric. In various embodiments, the sampling rate varies according to the number of actions in the action log data or the page action data. For example, the sampling rate may be inversely proportional to the number of actions associated with the specified identifier.

In one embodiment, the metric calculation engine 230 generates one or more metrics using a subset of actions associated with a specified object identifier and a sampling rate received from the sampling engine 240. For example, the metric calculation engine 230 extrapolates the number of unique user identifiers associated with actions associated with a specified object identifier by multiplying the sampling rate by the number of unique user identifiers in the subset of actions associated with the specified object identifier. The metric calculation engine 230 may also adjust a metric based on the percentage of unique user identifiers with respect to the number of actions in the sampled action log data. In other embodiments, the metric calculation engine 230 may use any other suitable method for extrapolating the number of unique user identifiers from a subset of actions received from the sampling engine 240. The sampling engine and the metric calculation engine 230 are further described below in conjunction with FIG. 3.

The metric store 235 stores metrics generated by the metric calculation engine and associates the stored metrics with their corresponding object identifier. Hence, a metric maintained by the metric store 235 is associated with an object identifier. A stored metric may also be associated with a timestamp, such as the date and time when the metric was generated. The metric calculation engine 230 may use timestamps associated with stored metric when calculating metrics for an object identifier. For example, if a metric in the metric store 235 is associated with a timestamp that is older than a specified time or is associated with a timestamp for a time greater than a specified interval from a current time, an updated metric is generated by the metric calculation engine and stored in the metric store 235. Additionally, a stored metric associated with an object identifier may be removed from the metric store 235 when a more recent metric for the object identifier is received or when the timestamp associated with the stored metric is greater than a specified interval from the current time. Depending on the amount of activity associated with an object, the metric for that object may be recalculated in near real time (e.g. once or more an hour). In some embodiments, a new metric is calculated for each object every time an action occurs that is associated with that object.

The web server 245 links the social networking system 140 via the network 120 to the one or more client devices 110, as well as to the one or more third party websites 130. The web server 245 serves web pages, as well as other web-related content, such as JAVA®, FLASH®, XML and so forth. The web server 245 may provide the functionality of receiving and routing messages between the social networking system 140 and a client device 110, for example, instant messages, queued messages (e.g., email), text and SMS (short message service) messages, or messages sent using any other suitable messaging technique. A user may send a request to the web server 245 to upload information, for example, images or videos that are stored in the content store 210. Additionally, the web server 245 may provide API functionality to send data directly to native user device operating systems, such as iOS®, ANDROID™, webOS® or a similar embedded operating system.

When a user requests an object from the social networking system 140, the web server 245 receives the request and retrieves a metric associated with the object's object identifier from the metric store 235. If the metric store 235 does not include a metric or if the stored metrics associated with the object identifier are not current, one or more metrics are calculated by the metric calculation engine 230. A metric associated with the object may be included in or otherwise presented to a user along with the object requested from the web server 245. Additionally, users may access one or more metrics associated with an object by identifying a metric and the object to the web server 245, such as through an application programming interface (API). For example, an API may allow a user to retrieve a popularity metric and a creation date and time for the popularity metric as well as allow the user to initiate calculation of an updated popularity metric via the metric calculation engine 230.

Figure 3:
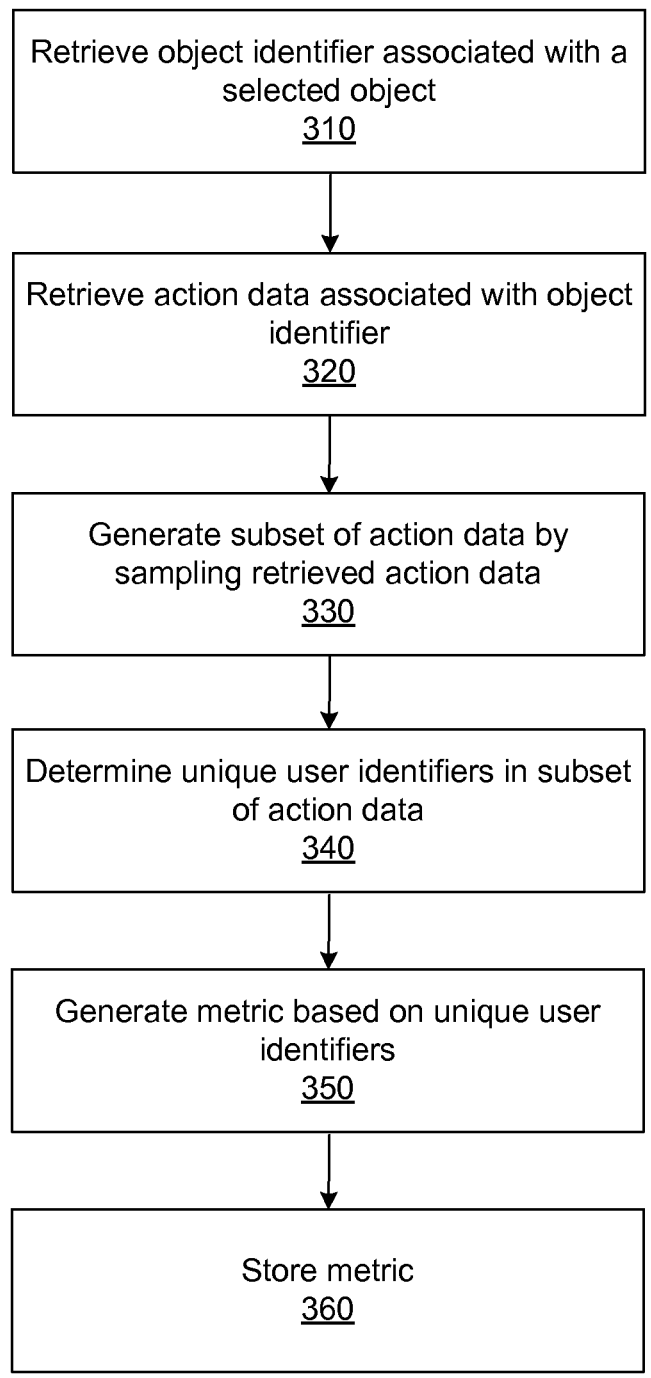
FIG. 3 is a flow chart of a method for determining a popularity metric, in accordance with an embodiment of the invention.

Calculating a Metric of User Interaction with Objects in a Social Networking System FIG. 3 shows a flow chart of a method 300 for determining one or more metrics describing interaction with an object in a social networking system 140 by social networking system users. An object is selected and an object identifier associated with the object is retrieved 310 from the content store 210. For example, a web server 245 receives an object identifier and a metric calculation engine 230 retrieves 310 the object identifier from the web server 245. In some embodiments, a topic is identified to the metric calculation engine 230 via the web server 245 and objects associated with the topic are identified from the topic extraction engine 250 and/or the content store 210. The metric calculation engine 230 retrieves 310 object identifiers associated with each of the objects associated with the topic from the content store 210 and/or from the topic extraction engine 250.

From the retrieved object identifier, or retrieved object identifiers if a metric is to be generated for a topic, the metric calculation engine 220 retrieves 320 action data from the action log 220 associated with the retrieve object identifier. In one embodiment, the retrieved action data includes actions that are communicated or otherwise distributed to at least one user in addition to the user performing the action. This allows the retrieved data to capture actions that reflect exposure of an object or topic to additional social networking system users, providing a more accurate assessment of its popularity among social networking system users. As described above in conjunction with FIG. 2, the action data in the action log associates an object identifier with a performed action and also associates a user identifier of the user performing the action with the action. The action data may further associate a timestamp with an action to indicate when the action was performed. For example, stored action data may have a format of "(object identifier), (action), (user identifier), (timestamp)," or a similar format. The retrieved action data includes actions performed on the object associated with the retrieved object identifier, or retrieved object identifiers.

Additional information may be provided along with the object identifier to specify the metric to be generated. For example, a subset of actions may be provided along with an object or object identifier to retrieve 320 action data associated with the object identifier and corresponding to an action in the subset of actions. A time interval may also be specified so that the retrieved action data includes actions associated with a timestamp within a specified time interval or associated with timestamps later than a specified time.

A subset of the action data associated with the retrieved object identifier is generated 330 by sampling the retrieved action data at a sampling rate. This reduces the number of actions associated with the retrieved object identifier when the retrieved action data includes a large number of actions, while allowing accurate assessment of user interaction with the object associated with the retrieved object identifier. A sampling engine 240, further described above in conjunction with FIG. 2, determines the sampling rate and generates 330 the subset by sampling the retrieved action data using the sampling rate. In some embodiments, the sampling rate varies based on the number of actions included in the action data, allowing the sampling rate to more effectively reduce the number of actions included in the subset. Generating the subset of action data allows one or more metrics to bet generated more efficiently.

The number of unique user identifiers in the subset of action data is determined 340 by the metric calculation engine 230. In some embodiments, the number of unique identifiers in the subset is determined 340 for one or more specified actions or for a specified time interval. Determining the number of unique user identifiers allows the metric calculation engine 230 to more accurately gauge user interest in a selected object or in objects associated with a selected topic. From the number of user identifiers in the subset of action data and the sampling rate, the metric calculation engine 230 determines a number of unique user identifiers associated with the selected object, or with the selected topic. In one embodiment, the metric calculation engine 230 multiplies the number of unique user identifiers associated with the subset by the sampling rate to determine the number of unique user identifiers associated with the retrieved action data. For example, if the sampling rate is five, one out of five actions in the action data is included in the subset of action data, so the number of unique user identifiers in the subset of action data is multiplied by five to determine the number of unique user identifiers associated with the retrieved action data.

Based on the number of unique user identifiers and/or on the unique user identifiers associated with the selected object or selected topic, the metric calculation engine 230 generates 350 one or more metrics associated with the selected object and/or the selected topic. For example, the metric identifies a total number of unique user identifiers associated with the selected object or with the selected topic, a total number of unique user identifiers associated with the selected object or with the selected topic during a time interval, a total number of unique user identifiers associated with the selected object and performing a specified type of action or actions or any other suitable metric.

In one embodiment, the metric calculation engine 230 may generate 350 a metric personalized for a user selecting the object. For example, a metric identifying a total number of unique user identifiers associated with users connected to the user selecting the object is generated 350 by identifying the unique user identifiers and generating a count of unique user identifiers having an edge associated with the user selecting the object from the edge store 225 and/or from the user profile store 205. Hence, the social networking system may present a user viewing a page with a metric identifying the number of unique social networking system users or interacting with the page as well as an additional metric identifying the number of unique users connected to the user viewing the page that have interacted with the page, personalizing the user interaction information.

The generated metric, or metrics, is associated with the selected object or with the selected topic and stored in the metric store 235 to simplify subsequent retrieval. A metric associated with an object may be retrieved from the metric store 235 and displayed proximate to the object by the social networking system, allowing a user to see the popularity of the object. For example, the social networking system may display "100 like this" or "11,561,530 talking about this" next to a representation of a page in the social networking system, allowing a user to account for the page's popularity when deciding to view the page. Multiple metrics may be displayed, such as "100 like this. 50 of your friends like this," to allow the user to see the popularity of a page, or other object, with users as a whole as well as with other users connected to the user. As another example, metrics may be retrieved and used when ranking objects in a search for content in the social networking system. For example, the number of unique users may be used when ordering search results to allow the ordering to account for the popularity of objects in the search results so that more popular objects have a higher position in the search results.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
    storing action data in a social networking system, the action data describing actions performed by users of the social networking system, each action associated with a user identifier and an object identifier;
    retrieving a selected object identifier associated with a selected object;
    retrieving action data associated with the selected object identifier, the retrieved action data identifying actions performed by users of the social networking system in connection with the selected object and communicated to at least one additional user;
    sampling the retrieved action data at a sampling rate to generate a subset of action data associated with the selected object identifier;
    determining a number of unique user identifiers associated with the selected object identifier based on a number of unique user identifiers in the subset of action data associated with the selected object identifier and based on the sampling rate, the unique user identifiers uniquely identifying users interacting with the selected object;
    generating a metric associated with the selected object identifier based on the number of unique user identifiers associated with the selected object identifier, the metric based on the sampled subset of action data generated in less time due to the sampling than it would take for a metric to be generated based on the retrieved action data without the sampling; and
    storing the metric and an association between the metric and the selected object identifier.

2. The computer implemented method of claim 1, wherein the selected object is a page maintained by the social networking system.

3. The computer implemented method of claim 1, wherein the selected object is selected from a group consisting of: an application maintained by the social networking system, a video included in the social networking system, a post of content to a page maintained by the social networking system and an image maintained by the social networking system.

4. The computer implemented method of claim 1, wherein retrieving action data associated with the selected object identifier comprises:
    retrieving action data associated with the selected object identifier and including actions associated with one or more specified action types.

5. The computer implemented method of claim 1, wherein retrieving action data associated with the selected object identifier comprises:
    retrieving action data associated with the selected object identifier and including actions associated with times within a specified time range.

6. The computer implemented method of claim 1, wherein the sampling rate is based on a number of actions identified by the retrieved action data associated with the selected object identifier.

7. The computer implemented method of claim 6, wherein the sampling rate is inversely proportional to the number of actions identified by the retrieved action data associated with the selected action identifier.

8. The computer implemented method of claim 1, wherein determining the number of unique user identifiers associated with the selected object identifier comprises:
    determining the number of unique user identifiers in the subset of action data; and
    calculating the number of unique user identifiers associated with the selected object by multiplying the number of unique user identifiers by the sampling rate.

9. The computer implemented method of claim 1, wherein generating the metric associated with the selected object identifier comprises:
    determining a number of unique user identifiers associated with actions performed within a specified time range.

10. The computer implemented method of claim 1, wherein generating the metric associated with the selected object identifier comprises:
    determining a number of unique user identifiers associated with actions having one or more specified types.

11. The computer implemented method of claim 1, wherein generating the metric associated with the selected object identifier comprises:
    determining a number of unique user identifiers associated with the selected object identifier and associated with users connected to a user accessing the selected object.

12. A computer implemented method comprising:
    storing objects in a social networking system, each object associated with an object identifier and including content and associated with a topic describing the content;
    storing action data in the social networking system, the action data describing actions performed by users of the social networking system, each action associated with a user identifier and an object identifier;
    receiving a specified topic;
    determining object identifiers associated with the selected topic;
    retrieving action data associated with the determined object identifiers, the retrieved action data identifying actions performed by users of the social networking system in connection with an object associated with the determined object identifiers and communicated to at least one additional user;

sampling the retrieved action data at a sampling rate to generate a subset of action data associated with the selected object identifiers;

determining a number of unique user identifiers associated with the determined object identifiers based on a number of unique user identifiers in the subset of action data associated with the determined object identifiers and based on the sampling rate, the unique user identifiers uniquely identifying users interacting with the selected object;

generating a metric associated with the specified topic based on the number of unique user identifiers associated with the determined object identifiers, the metric based on the sampled subset of action data generated in less time due to the sampling than it would take for a metric to be generated based on the retrieved action data without the sampling; and storing the metric and an association between the metric and the specified topic.

13. The computer implemented method of claim 12, wherein the object identifiers associated with the selected topic include at least one object identifier associated with a page maintained by the social networking system.

14. The computer implemented method of claim 12, wherein the object identifiers associated with the selected topic are associated with one or more selected from a group consisting of: an application maintained by the social networking system, a video included in the social networking system, a post of content to a page maintained by the social networking system and an image maintained by the social networking system.

15. The computer implemented method of claim 12, wherein retrieving action data associated with the determined object identifiers comprises:

retrieving action data associated with each of the object identifiers and including actions associated with one or more specified action types.

16. The computer implemented method of claim 12, wherein retrieving action data associated with the determined object identifier comprises:

retrieving action data associated with each of the object identifiers and including actions associated with times within a specified time range.

17. The computer implemented method of claim 12, wherein the sampling rate is based on a number of actions identified by the retrieved action data associated with the selected object identifier.

18. The computer implemented method of claim 17, wherein the sampling rate is inversely proportional to the number of actions identified by the retrieved action data associated with the selected action identifier.

19. The computer implemented method of claim 12, wherein determining the number of unique user identifiers associated with the determined object identifiers comprises:

determining the number of unique user identifiers in the subset of action data; and calculating the number of unique user identifiers associated with the selected object by multiplying the number of unique user identifiers by the sampling rate.

20. The computer implemented method of claim 12, wherein generating the metric associated with the specified topic comprises:

determining the number of unique user identifiers associated with actions performed within a specified time range.

21. The computer implemented method of claim 12, wherein generating the metric associated with the selected topic comprises:

determining the number of unique user identifiers associated with actions having one or more specified action types.

22. The computer implemented method of claim 12, wherein generating the metric associated with the selected object identifier comprises:

determining a number of unique user identifiers associated with the selected object identifier and associated with users connected to a user accessing the selected object.

* * * * *